June 18, 1963           J. R. BRADLEY           3,094,011
MOTION TRANSMISSION MECHANISM OF THE SCREW AND NUT TYPE
Filed June 15, 1960
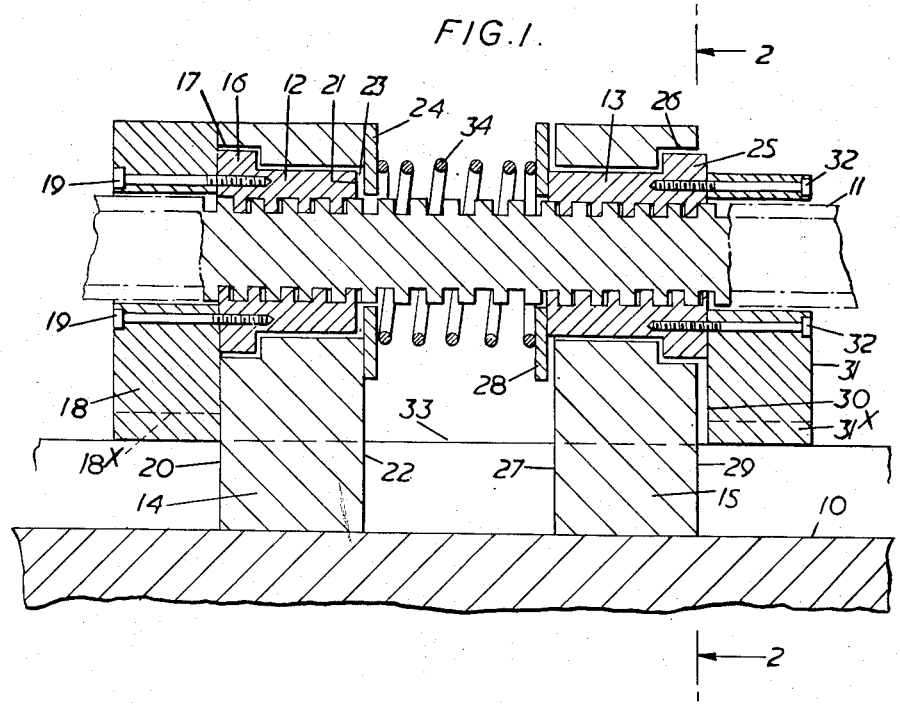
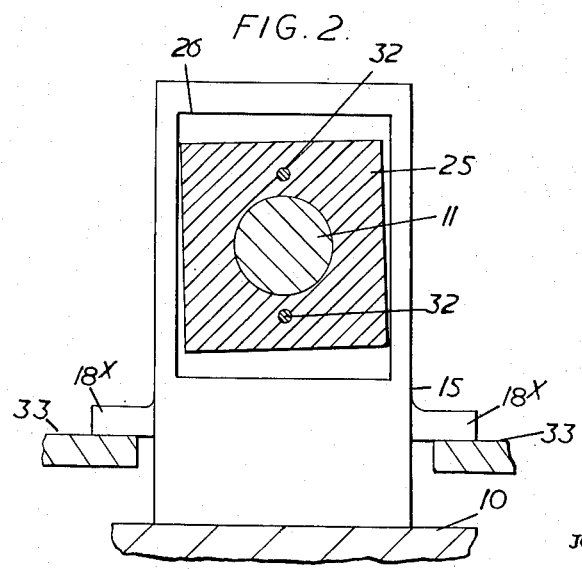
Inventor
JOHN RAMSEY BRADLEY
By
Aaron R. Townshend
Attorney

United States Patent Office 3,094,011
Patented June 18, 1963

3,094,011
MOTION TRANSMISSION MECHANISM OF
THE SCREW AND NUT TYPE
John Ramsey Bradley, Harlow, England, assignor to The
British Oxygen Company Limited, a British company
Filed June 15, 1960, Ser. No. 36,224
Claims priority, application Great Britain June 26, 1959
2 Claims. (Cl. 74—441)

This invention relates to a motion transmission mechanism of the screw and nut type, such for example as is frequently employed to effect movements of a machine tool table or the cutter carriage of a flame cutting machine.

One of the problems associated with a motion transmission mechanism of this type is the elimination of backlash or lost motion, and this problem assumes great importance in applications such as automatic machines employing reversing servomotors responsive to electrical signals.

The object of the invention is to provide an improved motion transmission mechanism of the screw and nut type, the main features being to provide for the taking up of backlash, which is the consequence of manufacturing and fitting tolerances between various parts of the mechanism, and to provide for support of the screw against radial deflection, particularly sagging.

According to the invention, in a motion transmission mechanism of the screw and nut type, a driven screw engages two separate nuts and said nuts are non-rotatably, but otherwise freely located by respective axially spaced first and second nut housings both rigidly secured to a body which is moved by rotation of the screw, one nut being provided with an attachment member which engages in the axial direction with the outermost end of the first nut housing and which provides the sole motion-transmitting axial engagement between said nut and said housing, a compression spring being provided which is of effective strength in excess of the normal operating loads of the mechanism and which acts between the first nut housing and the second nut to apply an axial force to said second nut in direction away from the first nut housing, the second nut being capable of sufficient free axial movement relative to its own nut housing as to take up backlash in the screw threads without making axial engagement with its housing.

According to a further feature of the invention, the second nut is also provided with an attachment member, and the attachment members of both the nuts embrace the screw as a close sliding fit and are slidably engaged with an independent and stationary horizontal guideway or guideways, whereby the screw is supported against radial deflection by said attachment members.

An embodiment of the invention will now be described with reference to the accompanying drawings, in which:

FIG. 1 is a sectional side elevation of the improved motion transmission mechanism.

FIG. 2 is a cross-sectional view on the line 2—2 of FIG. 1.

In the drawings, clearances due to manufacturing tolerances and fitting allowances have been shown greatly exaggerated for the purpose of illustrating the invention.

Referring to the drawings, a movable body 10, such as a machine tool table travelling along guides (not shown) is moved by rotation of a square-threaded lead screw 11 which engages two separate nuts 12 and 13. The nut 12 is located by a first nut housing 14, while the nut 13 is located by a second similar nut housing 15, the two housings 14 and 15 being spaced apart in the axial direction of the screw 11 and both being rigidly secured to the movable body 10. Alternatively the two nut housings could be at opposite ends of a base plate with which they are integral, and the base plate would then be secured to the body 10.

The nut 12 is provided with an end portion 16 which is rectangular in cross-sectional or end view, and this end portion 16 fits into a correspondingly shaped recess 17 in the first nut housing 14. The nut 12 is therefore non-rotatable relative to the nut housing 14, except for such clearance as is allowed for fitting between the rectangular portion 16 and the recess 17, and this clearance is, of course, one of the sources of backlash. Otherwise the nut 12 is neither attached to nor engaged by the nut housing 14, being freely located thereby.

It will be appreciated that the nut end portion 16 and the recess 17 could be of any non-circular contour which prevents their relative rotation, and need not be rectangular.

An attachment member 18 which embraces the screw 11 as a close sliding fit is secured to the nut 12 by set screws 19, and this attachment member 18 makes contact in the axial direction with the outermost end face 20 of the first nut housing 14 for transmitting motion to the latter and the body 10, i.e. to the right in FIG. 1. It will be noted that the inner end face 21 of the nut 12 is set back in the axial direction from the inner end face 22 of the first nut housing 14, so as to provide an axial clearance space 23 between said inner end face 21 of the nut 12 and a thrust washer 24 which is in contact with the inner end face 22 of the first nut housing 14.

The attachment member 18 has projections 18× which extend laterally of the nut housing 14, as shown at 18× in FIG. 2, and bear upon independent and stationary guideways 33, so that the attachment member 18 serves as a sliding support bearing or steady for the screw 11 and supports it against radial deflection such as sagging, and also acts to maintain concentricity of the screw and the nut 12, since the nut is secured to the attachment member 18 which embraces the screw as a close sliding fit.

The second nut 13 is also provided with an end portion 25 which is of rectangular cross-section, and which is shown in FIG. 2, and this end portion 25 fits into a correspondingly shaped recess 26 in the second nut housing 15. The nut 13 is therefore non-rotatable relative to the second nut housing 15, except for such clearance as is allowed for fitting between the rectangular portion 25 and the recess 26, and the nut 13 is freely located by the housing 15 in like manner as is the first nut 12. This clearance between the recess 26 and the end portion 25 of the nut 13 is one of the sources of backlash, and is illustrated in an exaggerated scale in FIG. 2. It will be noted that the nut 13 is of greater overall axial length than the corresponding length of its nut housing 15, so that it projects slightly from both the inner and outer ends of the housing, and this projection of the nut 13 provides that there is an axial clearance between the inner face 27 of the nut housing 15 and a thrust washer 28 which is in contact with the inner end of the nut 13, and also an axial clearance between the outer end face 29 of the nut housing 15 and the inner end face 30 of an attachment member 31 which is secured to the nut 13 by set screws 32. The attachment member 31 has lateral projections 31× which bear on the guideways 33, so that the attachment member 31 acts as a sliding support bearing or steady for the screw 11, in like manner to the first attachment member 18, and also maintains concentricity between the screw 11 and the second nut 13.

The nut 13 is thus capable of sufficient free axial movement in relation to the second nut housing 15 as to take up any backlash there may be between the threads of the screw 11 and the nut 13, without any part of the nut 13 or its attachment member engaging the housing 15 in axial direction.

A compression spring 34 acts between the thrust washers 24 and 28, and is of effective strength in excess of the normal maximum operating loads of the mechanism (i.e. inertia plus screw friction).

Backlash due to all sources is taken up automatically by the spring 34, due to the particular construction of the mechanism, in both directions of rotation of the screw 11.

Thus, the spring 34, acting effectively between the inner end face 22 of the first nut housing 14 and the axially "floating" nut 13, exerts an axial force on the nut 13 which takes up backlash between the threads of the nut 13 and the screw 11, the exaggerated clearance being illustrated in FIG. 1. The interaction of the threads produces a turning effect on the nut 13 tending to take up fitting allowance between the rectangular end portion 25 and the socket 26, but this turning effect is resisted when the fitting allowance is taken up, and is also resisted by the guideways 33 engaged by the lateral extensions $31^{\times}$.

The axial force of the spring transmitted to the screw 11 via the nut 13 takes up backlash between the threads of the screw and the nut 12, and tends to produce a turning effect on the nut 12 which is either resisted by the projections $18^{\times}$ engaging the guideways 33 or takes up fitting allowance between the rectangular portion 16 of the nut 12 and the socket 17, and also ensures constant driving contact between the inner end face of the attachment member 18 and the outer end face of the first nut housing 14, the exaggerated clearance between the threads of the nut 12 and the screw 11 being illustrated in FIG. 1. It will be seen that motion of the body 10 to the left in FIG. 1 is transmitted from the screw 11 via the nut 13, the thrust washer 28, the spring 34, the thrust washer 24 and the first nut housing 14.

Lateral clearances between appropriate parts of the mechanism can be deliberately provided to accommodate slight misalignments which may be present, for example, misalignment between the driving member (the screw 11) and the driven member (the body 10). The feature of providing these lateral clearances results in the attainment of desirable backlash-free lateral "float" between adjacent parts of the mechanism with consequent latitude of manufacturing tolerances.

The attachment members 18 and 31 act as sliding support bearings for the screw 11 since they embrace the latter in the vicinity of the respective nuts 12 and 13. This supporting of the screw 11 against radial deflection such as sagging is an important feature of the invention, especially where a screw 11 of considerable length is employed, since it allows the employment of a screw of appreciably smaller diameter than would be required if end bearings only were provided for the screw. There is also the feature that the attachment members 18 and 31 maintain concentricity between the nuts 12, 13 and the screw 11, since the attachment members both carry the nuts and provide bearings for the screw. Whereas the attachment member 1 is engaging the first nut housing 14 for transmission of motion besides acting as a sliding support bearing or steady for the screw 11, the other attachment member 31 takes no part in motion transmission while still acting as a sliding support bearing for the screw 11.

I claim:

1. In a motion transmission mechanism of the screw and nut class, the combination with said screw of first and second separate nuts engaging said screw at locations axially spaced thereon, a movable body, first and second nut housings secured to said body at spaced locations corresponding to the spacing of said nuts, non-circular portions on said nuts located in correspondingly shaped recesses in said nut housings for restraining said nuts only against rotation but with said nut housings otherwise freely locating the respective nuts on said screw, an attachment member, means rigidly securing said attachment member to said first nut for engagement of said attachment member with the outermost end of said first nut housing, and a compression spring of effective strength in excess of the normal operating loads of the mechanism acting between the innermost end of said first nut housing and the innermost end of the second nut, said second nut having sufficient free axial clearance with the second nut housing for the taking up of backlash between the screw threads of the nuts and the screw by said spring.

2. In a motion transmission mechanism of the screw and nut class, the combination with said screw of first and second separate nuts engaging said screw at locations axially spaced thereon, a movable body, first and second nut housings secured to said body at spaced locations corresponding to the spacing of said nuts, non-circular portions on said nuts located in correspondingly shaped recesses in said nut housings for restraining said nuts only against rotation but with said nut housings otherwise freely locating the respective nuts on said screw, a first attachment member, means rigidly securing said attachment member to said first nut for engagement of said attachment member with the outermost end of said first nut housing, a second attachment member, means rigidly securing said second attachment member to said second nut, each of said attachment members having an aperture through which said screw passes as a close sliding fit, at least one independent and stationary horizontal guideway in supporting engagement with both said attachment members, and a compression spring of effective strength in excess of the normal operating loads of the mechanism acting between the innermost end of said first nut housing and the innermost end of the second nut, said second nut having sufficient free axial clearance with the second nut housing for the taking up of backlash between the screw threads of the nuts and the screw by said spring.

References Cited in the file of this patent
UNITED STATES PATENTS

| | | |
|---|---|---|
| 1,874,491 | Fritschi | Aug. 30, 1932 |
| 2,778,239 | Hoover | Jan. 22, 1957 |